A. V. ROWE.
GATE.
APPLICATION FILED MAY 17, 1909.
928,798.  Patented July 20, 1909.
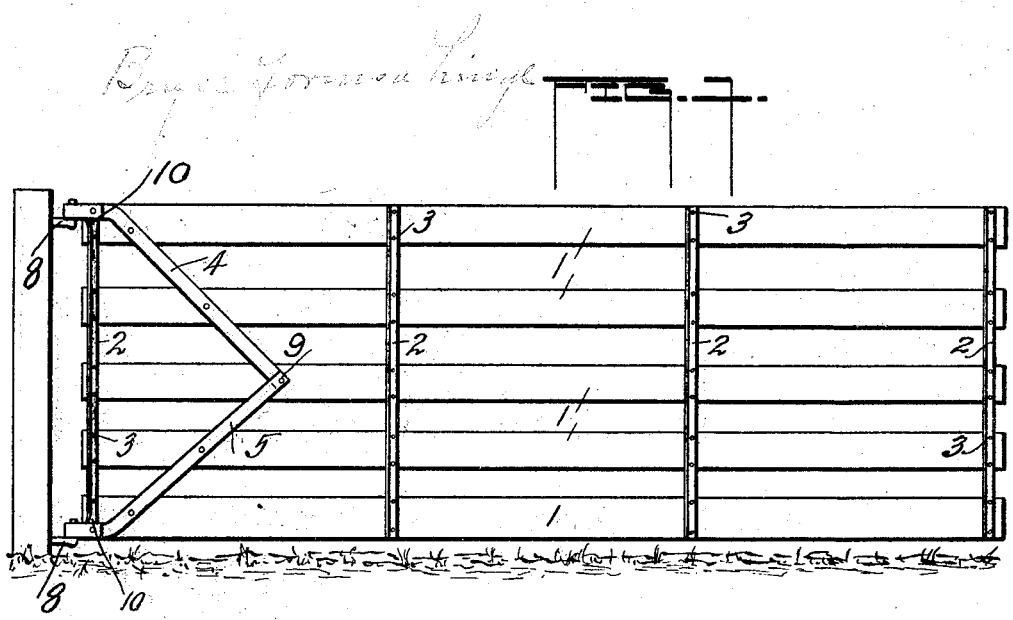
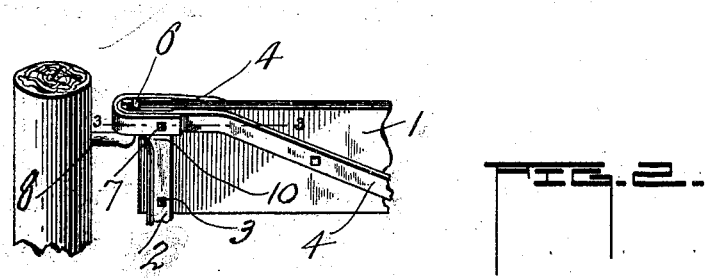
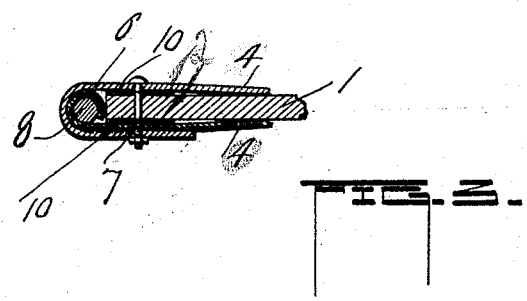
Witnesses  Inventor

UNITED STATES PATENT OFFICE.

ALVIN V. ROWE, OF GALESBURG, ILLINOIS.

GATE.

No. 928,798.     Specification of Letters Patent.     Patented July 20, 1909.

Application filed May 17, 1909. Serial No. 496,346.

*To all whom it may concern:*

Be it known that I, ALVIN V. ROWE, a citizen of the United States, residing at Galesburg, in the county of Knox and State of Illinois, have invented certain new and useful Improvements in Gates; and I do hereby declare that the following is a full, clear, and exact description of the invention, which will enable others skilled in the art to which it appertains to make and use the same.

This invention has reference to an improvement in gates, and particularly to a horizontally swinging gate.

The invention has for its object, an improved hinge for a gate and a truss brace therefor, which terminates in said hinge.

A further object of the invention, is to construct a horizontally swinging gate which shall be free from all sagging and to accomplish this, a double truss is formed terminating in upper and lower hinges on which the gate may be hung. The upper hinge acting as a hanging brace, while the lower hinge, it might be said, acts as a standing brace.

That the invention may be more fully understood, reference is had to the accompanying drawings in which,—

Figure 1 is an elevation of my improved gate and hinge therefor, the same shown hinged to a post; Fig. 2 is a detail perspective showing the upper hinge and its connection to the gate; Fig. 3 is a horizontal cross section on the line 3—3 of Fig. 2.

Like numerals of reference indicate corresponding parts throughout the figures.

The gate is constructed preferably of a plurality of superimposed longitudinal slats or boards 1, which are suitably spaced apart from top to bottom and secured in proper relative position by a plurality of parallel transverse angle iron uprights 2. These uprights are arranged in pairs upon the opposite sides of the slats or boards constituting the gate, and are preferably bolted together by bolts 3, which pass through the angle iron uprights 2 and the boards 1.

The hinge for the gate comprises the diagonally disposed brace members 4 and 5, which are arranged in duplicate on opposite sides of the gate and constitute what may be termed a double truss. The upper brace member 4 on the near side of the gate, looking at Fig. 2, crosses the upper end of the upright 2, and is formed into the eye 6 at the rear end of the topmost slat or board 1. The brace member 4 on the opposite side of the gate, looking at Fig. 2, crosses the upright 2 and passes around the eye 6 of the first mentioned brace member 4 and passing around onto the near side of the gate, lies in juxtaposition to the first mentioned brace member 4, and said brace members are secured by a bolt 7, which passes through the brace members 4, the uprights 2 and the topmost board 1, as shown in Fig. 3. The brace members 4 are preferably steel bars and the hinge formed by said bars is very rigid and strong. It is intended that the upper hinge, likewise the lower hinge, are to be hung on lag-screws, 8, as shown in Figs. 1 and 2. The brace members 4 and 5 as shown in Fig. 1, extend diagonally toward the center of the gate, and their ends meet and are preferably bolted together, and to the center slat or board 1 of said gate, by a bolt 9.

The lower brace members 5 on opposite sides of the gate, are constructed substantially the same as the brace members 4 to form a hinge at the lower end of the gate, one of said brace members forming an eye, and the other of said brace members passing around the eye and the parts being bolted substantially the same as was described for the brace members 4, and it is thought that the description of the formation of the hinge of the brace members 4, will suffice as a description for the hinge of the brace members 5.

The uprights 2 at the end of the gate at which the brace members 4 and 5 cross and to which said brace members are secured, are flattened out as at 10, see Fig. 3, so that said brace members may cross said upright and be secured thereto, without the necessity of bending the same to carry them across the right angle portion of said uprights.

While I have shown and prefer to cross the ends of the upper and lower brace members 4 and 5, and bolt the same together, yet it is understood that they need not necessarily be connected in this way, and that they may terminate short of the center slat or board and be bolted to the other slats or boards constituting the gate. It will be observed, however, that with the peculiar construction of a hinge such as I provide, that the braces forming said hinges, form what might be termed a double truss and that the upper braces serve as a hanging brace, while the lower braces act as a standing brace.

Having thus fully described my invention, what I claim and desire to secure by Letters Patent of the United States, is:—

1. In a gate, the combination of diagonally disposed brace members arranged in duplicate on opposite sides of the gate, one of said members formed with an eye to receive a hinge member, the other of said members passing around the eye from one side of the gate to the other, and bolted to said first mentioned member.

2. In a gate, the combination of a duplicate pair of brace members connected at their inner ends and diverging from each other toward the upper and lower edges of said gate, the members on one side of the gate at their outer ends formed with an eye to receive hinge members, the members on the opposite side of the gate passing around the eyes of said first mentioned members, and means for securing the overlapping ends of said members.

3. In a gate, the combination of rear end transverse bars formed of angle iron and their upper and lower ends flattened, duplicate brace members connected at their inner ends, diverging from each other and crossing the flattened ends of said transverse bars, the outer ends of two of said members formed with a pintle receiving portion, the corresponding ends of the other of said members passing around said pintle receiving portion of said mentioned members, and means for securing said members to said flattened portions of the transverse bars and to each other.

In testimony whereof I affix my signature, in presence of two witnesses.

ALVIN V. ROWE.

Witnesses:
 N. R. MOORE,
 B. F. BRADBURY.